(12) United States Patent
Girardello et al.

(10) Patent No.: US 6,193,820 B1
(45) Date of Patent: Feb. 27, 2001

(54) METHOD FOR THE THERMAL TREATMENT OF BUSHINGS, PARTICULARLY FOR TRACKED VEHICLES AND THE LIKE

(76) Inventors: Bruno Girardello, Quartiere Longhin, 26, 31039 Riese Pio X (Prov. Treviso); Pierangelo Girardello, Via Monfenera, 40; Giampaolo Girardello, Via Monfenera, 7, both of 31033 Castelfranco Veneto (Prov. Treviso), all of (IT)

( * ) Notice: Subject to any disclaimer, the term of this patent is extended or adjusted under 35 U.S.C. 154(b) by 0 days.

(21) Appl. No.: 08/958,793

(22) Filed: Oct. 27, 1997

(30) Foreign Application Priority Data

Nov. 14, 1996 (IT) .............................. TV96A0146

(51) Int. Cl.⁷ .................. C21D 9/00; C21D 9/14
(52) U.S. Cl. ..................... 148/639; 148/589; 148/590
(58) Field of Search ................... 148/589, 590, 148/639

(56) References Cited

U.S. PATENT DOCUMENTS

| | | | |
|---|---|---|---|
| 4,401,485 | 8/1983 | Novorsky | 148/571 |
| 4,453,986 | 6/1984 | Sponseller et al. | 148/547 |
| 5,009,000 | 4/1991 | Wilmeth et al. | 148/279 |

FOREIGN PATENT DOCUMENTS

| | | |
|---|---|---|
| 0 079 864 | 5/1983 | (EP) . |
| 0 375 392 | 6/1990 | (EP) . |
| 0 455 346 | 11/1991 | (EP) . |

OTHER PUBLICATIONS

Patent Abstracts of Japan vol. 014, No. 017 (C–675), 16 janvier 1190–& JP 01 259129 A (Topy Ind Ltd), Oct. 16, 1989 *abrégé*.

Patent Abstracts of Japan vol. 017, No. 406 (C–1090), 29 juillet 1993–& JP 05 078745 A (Topy Ind Ltd), Mar. 30, 1993 * abrégé*.

Patent Abstracts of Japan vol. 017, No. 406 (C–1090), 29 juillet 1993–& JP 05 078745 A (Topy Ind Ltd), Mar. 30, 1993 * abrégé*.

Primary Examiner—Sikyin Ip
(74) Attorney, Agent, or Firm—Guido Modiano; Albert Josif; Daniel O'Byrne

(57) ABSTRACT

A method for the thermal treatment of bushings, particularly for tracked vehicles and the like, which provides for a first step, during which external quench hardening of the bushing is performed by heating through to approximately $7/10$–$10/10$ of the thickness of the bushing, followed by cooling with quenching liquid; then a second step for internal quench hardening is performed by heating the bushing through to approximately $4/10$–$7/10$ of the thickness thereof and then cooling with quenching liquid; the method ends by performing a step for the stress relieving of the bushing. A product at low costs can thus be obtained which has better wear resistance and fatigue strength than observed in bushings obtained with conventional methods.

13 Claims, 5 Drawing Sheets

METALLURGICAL STRUCTURE OF A BUSHING OBTAINED WITH A METHOD INCLUDING CORE HARDENING AND TEMPERING AND EXTERNAL AND INTERNAL INDUCTION HARDENING

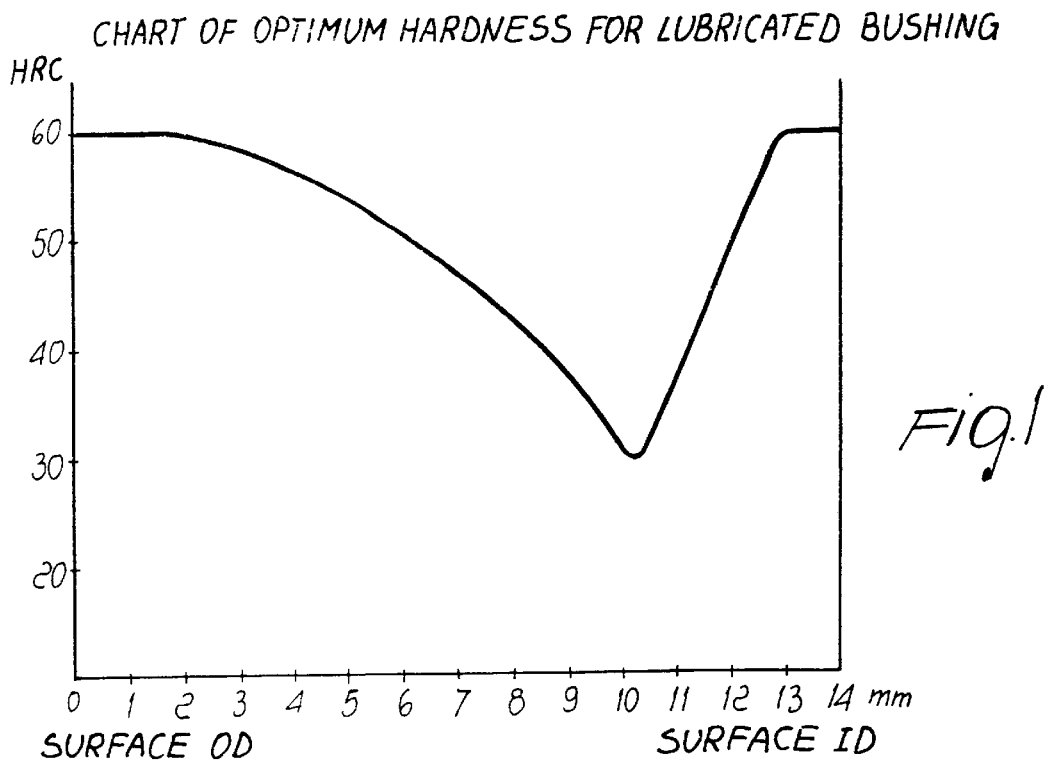
Fig.1 — CHART OF OPTIMUM HARDNESS FOR LUBRICATED BUSHING
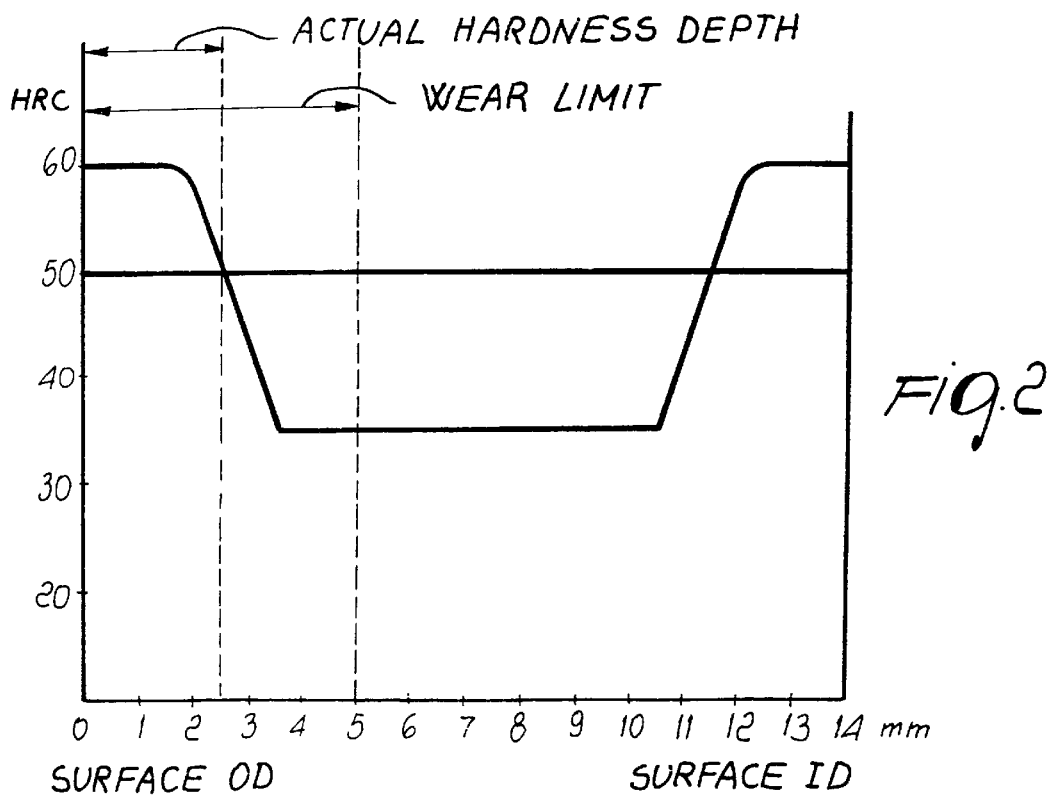
Fig.2 — HARDNESS CHART FOR A BUSHING OBTAINED BY CASEHARDENING AND QUENCH HARDENING

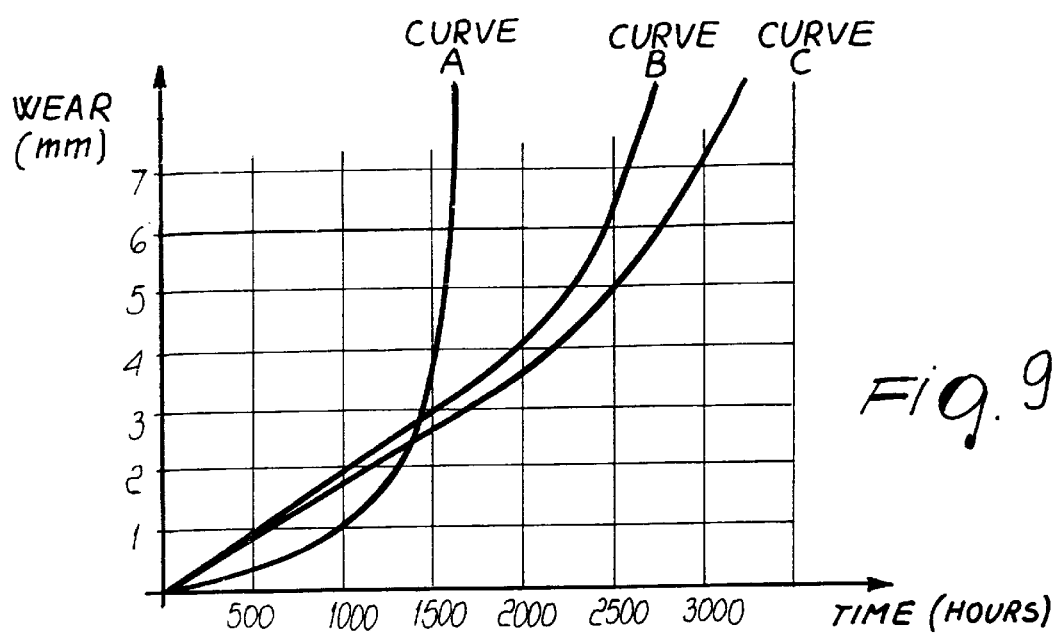
CURVE A: CONVENTIONAL CASEHARDENING PLUS QUENCH HARDENING METHOD
CURVE B: CONVENTIONAL METHOD WITH CORE HARDENING AND INTERNAL AND EXTERNAL INDUCTION HARDENING
CURVE C: METHOD ACCORDING TO THE INVENTION
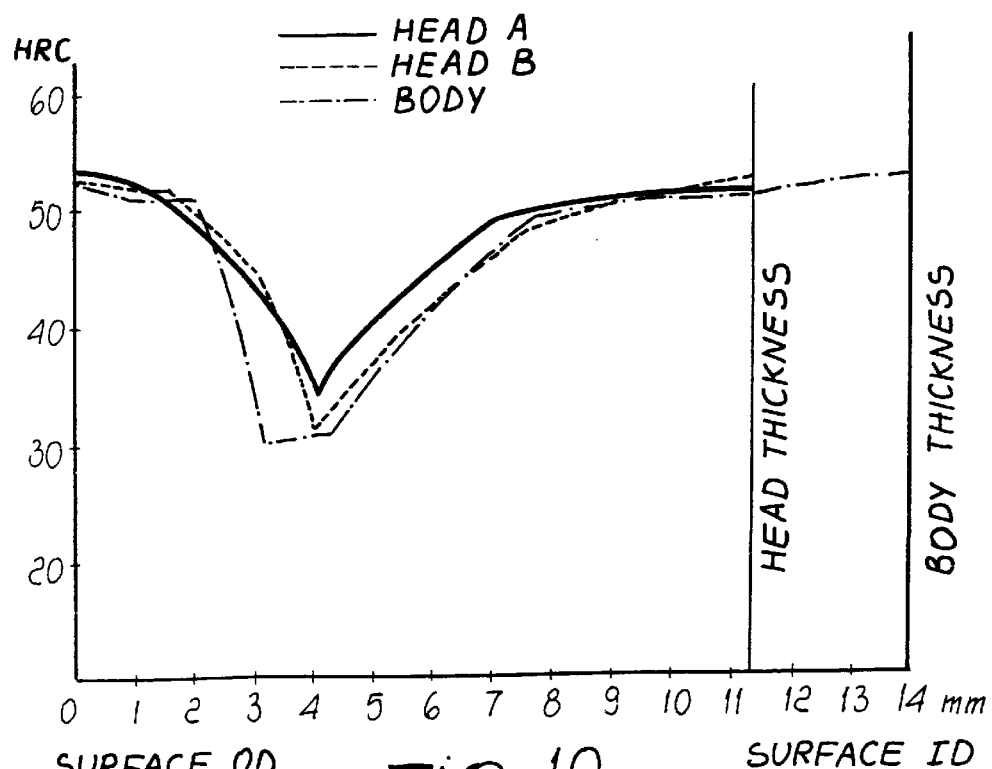

METHOD FOR THE THERMAL TREATMENT OF BUSHINGS, PARTICULARLY FOR TRACKED VEHICLES AND THE LIKE

BACKGROUND OF THE INVENTION

The present invention relates to a method for the thermal treatment of bushings, particularly for tracked vehicles and the like.

Tracked vehicles are currently used for movement in particularly challenging and highly abrasive environments; accordingly, their tracks are subjected to considerable wear and even to fatigue caused by specific compressions and vibrations, and this requires rapid replacement in case of failure as well as a plurality of replacements during the working life of the tracked vehicle.

In particular, the track is composed of various components and substantially consists of an endless chain with which shoes are associated; said shoes are generally mutually bolted to a connecting assembly and can be disassembled independently of the other components of the track.

Said track is thus composed of links, pins and bushings in addition to gaskets, pusher rings and lubricators; these components are assembled by applying pressure to the respective ends of the connecting elements on the pins and on the bushings by means of high-power presses for tracks (which apply a force of approximately 50–60 tons).

Accordingly, if it is necessary to replace a specific worn component of the track, it is first of all necessary to remove the track from the vehicle and take said track to a workshop equipped with specific track presses, and this entails rather high costs and long times.

In detail, it must be also noted that each one of the various components of the track has an individual resistance to wear which can vary considerably among the components.

Originally, the problem of wear mainly involved the pins and the inner surface of the bushings coupled thereto; this problem has been overcome by using sealed and lubricated tracks which in fact have considerably reduced wear of the pin and of the corresponding internal seat of the bushing in which it is accommodated.

Among all the components, the one that is currently subject to the fastest wear is essentially constituted by the outer surface of the bushing; said wear occurs mainly because of the contact, and consequent friction, between the teeth of the driving sprocket when it engages and disengages said bushing.

The typical environment in which said tracked vehicles operate is also characterized by the presence of large amounts of abrasive materials, such as sand, slag, rocks, dirt and mud which thus make direct contact with the outer surface of the bushing, which in turn makes contact with the driving sprocket.

It should also be noted that the bushings are also subject to fatigue failures, which occur for example when the bushings are subjected to vibrations caused by excavation work or when they are subjected to intense compressions limited to specific points; it must be in fact considered that when for example excavators work on terrain which is uneven owing to the presence of rocks, holes, etcetera, a single bushing might have to bear the weight of the entire tracked vehicle.

Bushings can be obtained nowadays starting from a steel tube which is then machined or are normally produced starting from round steel bars by cutting, drilling or drawing with subsequent turning in order to make them assume the intended shape.

In order to extend the life of said bushings, they are conventionally subjected to thermal treatments which are essentially of two kinds: casehardening plus quench hardening, or core hardening and tempering plus internal and external induction hardening.

The purpose of these conventional treatments is to obtain a surface hardness which is sufficient to provide high wear resistance and toughness in the central part of the bushing (also known as "core") which is capable of withstanding fatigue stresses.

Surface hardness is measured in HRC; a surface hardness of more than 50 HRC is considered ideal for wear resistance, whilst a value of less than 45 HRC is considered necessary to ensure correct core toughness of the part.

Accordingly, a problem arising in the treatments of these bushings is the fact that it is necessary to try to bring the outer surface part to an optimum hardness down to a depth which is sufficient to ensure that the part is wear-resistant and at the same time to leave the core with a hardness which is low enough to ensure high toughness; however, the core must be hard enough to ensure resistance of the part to failures caused by intense specific pressures; moreover, in order to contain costs it would be necessary to leave the lowest possible high-hardness thickness for the inner surface of the bushing.

These problems are not solved in an optimum manner by the prior art, in which for example the casehardening plus quench hardening method is aimed at superficially enriching with carbon a steel which has a low carbon content (casehardening steel, UNI 7846/78 standards); the casehardening process occurs by raising the part to a temperature of approximately 950° C. and making a gas with a high carbon content flow all around it inside a hermetic furnace (casehardening furnace).

The gas transfers part of its carbon content to the part by diffusion; for bushings, this process lasts approximately 20 to 30 hours of immersion in the gas, after which the part, once it has been cooled and removed from the casehardening furnace, is reheated to a temperature of approximately 900° C. and drastically cooled with a quenching liquid, such as water, water with additives or other (quenching process).

Then the stress relieving step is performed; in other words, the part is heated, in an electric or gas or other furnace, to a temperature of 150–200° C. for one or more hours, according to the size and type of treatment performed; this is done to increase the toughness of the casehardened region of the part and to eliminate the tensions inside the steel caused by said treatment.

A bushing treated in this way has, under micrographic observation, a metallurgical structure mainly of the martensitic type throughout its cross-section, and therefore with some residues of intermediate cooling structures (for example bainite) in the core in an amount directly proportional to the thickness of the part itself.

As a consequence of this conventional treatment, the part achieves high surface hardness, for example to a depth which can vary between 1.5 and 3.5 mm, and a lower hardness in the core; FIG. 2 illustrates a hardness curve of a casehardened bushing.

The conventional method described above, however, has the drawbacks mentioned earlier: it is in fact not possible, with this method, to differentiate the thickness of the harder layer between the outer surface and the inner surface of the bushing and the metallurgical structure in the core does not allow great fatigue strength.

Moreover, if it is intended to use this method to reach increasingly deeper layers, for example beyond 3.5 mm, with a hardness of more than 50 HRC, the casehardening temperature should be increased with the effect, however, that further problems regarding the life of the casehardening furnace itself would come out.

As an alternative, the part would have to be kept in the furnace for a longer time and this in any case would increase the treatment time and therefore the overall costs.

The ratio between the thickness of the hardened layer d and the casehardening time t is determined by the formula $d=k\sqrt{t}$, where k is the constant determined by the type of steel, by the casehardening atmosphere and by the temperature; therefore, if thickness is to be increased for example from 4 mm to 7 mm the casehardening treating times have to be tripled, and this would entail a considerable increase in the costs of the operation; moreover, it has been observed that defects tend to form on the surface of the bushing in the form of an oxidized intergranular layer (abnormal casehardening layer), which in effect significantly reduces the fatigue strength of the component.

The conventional process for core hardening and tempering plus external and internal induction hardening is instead aimed at achieving mechanical and metallurgical characteristics which allow to improve wear resistance and fatigue strength with respect to the treatment by casehardening plus quench hardening; this conventional method, which provides for the use of a particular material to be processed, such as a hardened and tempered steel, essentially consists of four steps: the first step is also known as "mass hardening" and tempering and entails treatment by heating the part to a temperature above the austenitizing limit of the part (approximately 820–860° C.) for a time which is sufficient for the complete conversion of the material (approximately 1 hour) and is then drastically cooled with a quenching liquid; the bushing is then heated further to a temperature which is below the critical transformation point and varies according to the intended hardness of the part at the end of the mass process; the tempering step lasts approximately 1 hour.

The second step of the process is also known as "external quench hardening": the part is superficially heated to a depth of approximately 3.5–6 mm with an electromagnetic induction system and cooled immediately with a jet of coolant liquid.

The third step is known as "internal quench hardening": the same process of heating followed by quick cooling is performed for the internal surface as well, with a hardening depth (depth of the hardened layer) of approximately 1–2.5 mm.

The fourth step is known as "stress relieving": the same type of stress relieving as in the casehardening plus quench hardening treatment is performed in order to increase the toughness of the part and eliminate the tensions inside the steel caused by the treatment itself.

Graphically, the result can be shown by FIG. 3, wherein the metallurgical structure obtained with this conventional method has, at the core, a tempered martensitic structure (sorbite) whilst there is provided a martensitic structure on the surface regions of the inside and outside diameters of the bushing (not on the heads).

Two regions having a mixed structure (ferrite, bainite, pearlite) form between the outer regions and the core of the bushing: the presence of a sorbitic structure in the core allows to have a much higher toughness than obtained with a martensitic structure (as in the casehardening plus quench hardening process).

FIG. 4 plots the hardness of the part obtained in this manner: it shows that it is possible to obtain a thickness with a hardness of more than 50 HRC which is greater on the outside diameter and smaller on the inside diameter, with thickness values which can be much higher than the 3.5 mm that can be obtained with the casehardening process, whilst the core decreases to a hardness of 20–25 HRC.

SUMMARY OF THE INVENTION

The aim of the present invention is to solve the described problems, by eliminating the drawbacks of the cited prior art and thus providing a method for the thermal treatment of bushings which allows to obtain, at low costs and times, bushings which have a longer life and thus a higher wear resistance and ultimate strength than bushings obtained with conventional processes.

Within the scope of the above aim, an important object is to provide a method which allows to obtain bushings in which it is possible to differentiate the thickness of the layer having a hardness of more than 50 HRC between the outer surface and the inner surface and wherein it is also possible to reach much deeper thicknesses on the outer surface than obtainable with the conventional casehardening plus quench hardening process.

Another important object of the invention is to provide a method which allows to obtain a bushing which has greater toughness than conventional ones as well as greater elasticity of the part with respect to conventional casehardening and quench hardening treatments.

Another important object of the invention is to provide a method which allows to obtain products which combine with the above illustrated advantages that of having lower costs for equal mechanical characteristics obtainable by means of the described conventional methods.

This aim, these objects and others which will become apparent hereinafter are achieved by a method for the thermal treatment of bushings, particularly for tracked vehicles and the like, characterized in that it provides for the following steps, possibly in different sequences:
  a) external quench hardening by heating through to approximately 7/10–10/10 of the thickness of said bushing and cooling with quenching liquid;
  b) internal quench hardening with heating through to approximately 4/10–7/10 of the thickness of said bushing and cooling with quenching liquid;
  c) stress relieving of said bushing.

BRIEF DESCRIPTION OF THE DRAWINGS

Further characteristics and advantages of the present invention will become apparent from the following detailed description of a particular but not exclusive embodiment thereof, illustrated only by way of non-limitative example in the accompanying drawings, wherein:

FIG. 1 is a chart showing optimum hardness for lubricated bushings;

FIG. 2 is a chart showing hardness for a bushing obtained by conventional casehardening and quench hardening;

FIG. 9 is a chart showing the comparative wear profiles of bushings obtained with conventional methods and with the method according to the present invention; and FIG. 10 is a chart showing the hardness profiles of three cross-sections of a bushing obtained by the method according to the present invention.

DESCRIPTION OF THE PREFERRED EMBODIMENTS

With reference to the above figures, the method for the thermal treatment of bushings, particularly but not exclusively for tracked vehicles and the like, provides for a first step in which quench hardening is performed by heating the bushing, starting from its outer surface, through to a thickness equal approximately to $7/10$–$10/70$ thereof at a temperature of therefore approximately 800–900° C. by induction heating.

The part is then cooled with quenching liquid.

Figure 3:
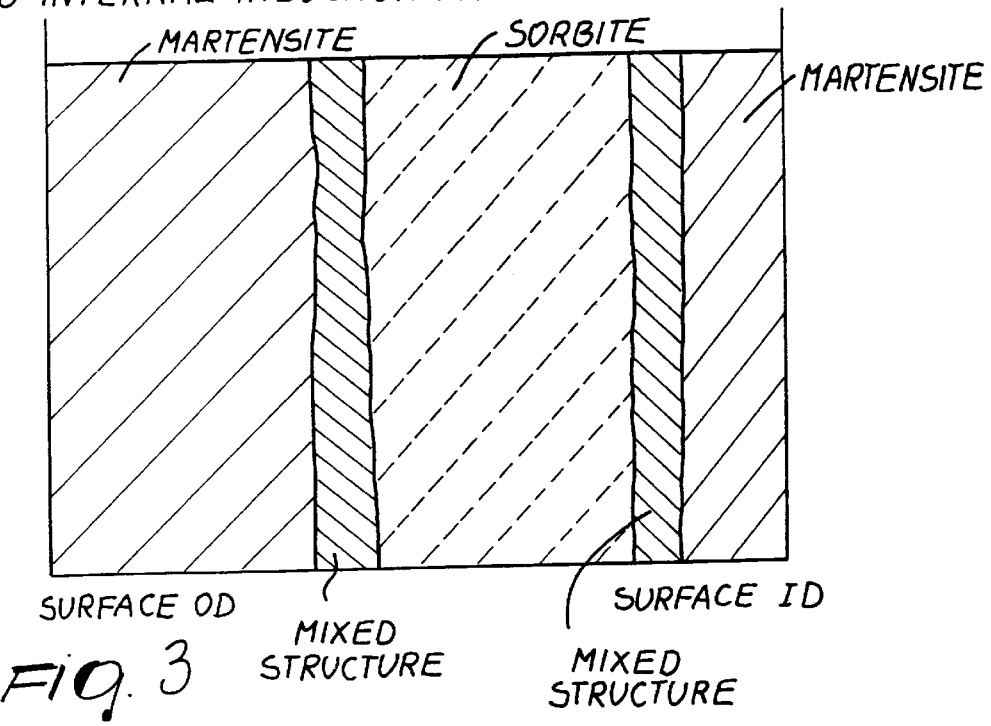
FIG. 3 is a chart showing the mretallurgical structure of a bushing obtained by conventional core hardening and tempering, and external and internal induction hardening.
Figure 4:
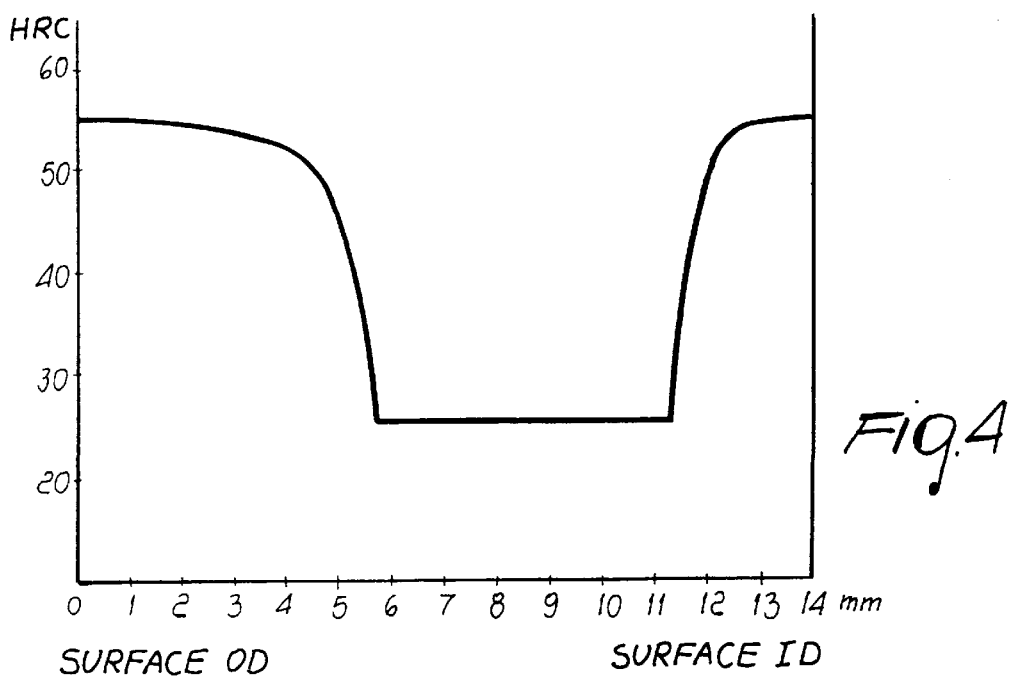
FIG. 4 is a chart showing the hardness profile of the bushing with the metallurgical structure as shown in FIG. 3.
Figure 5:
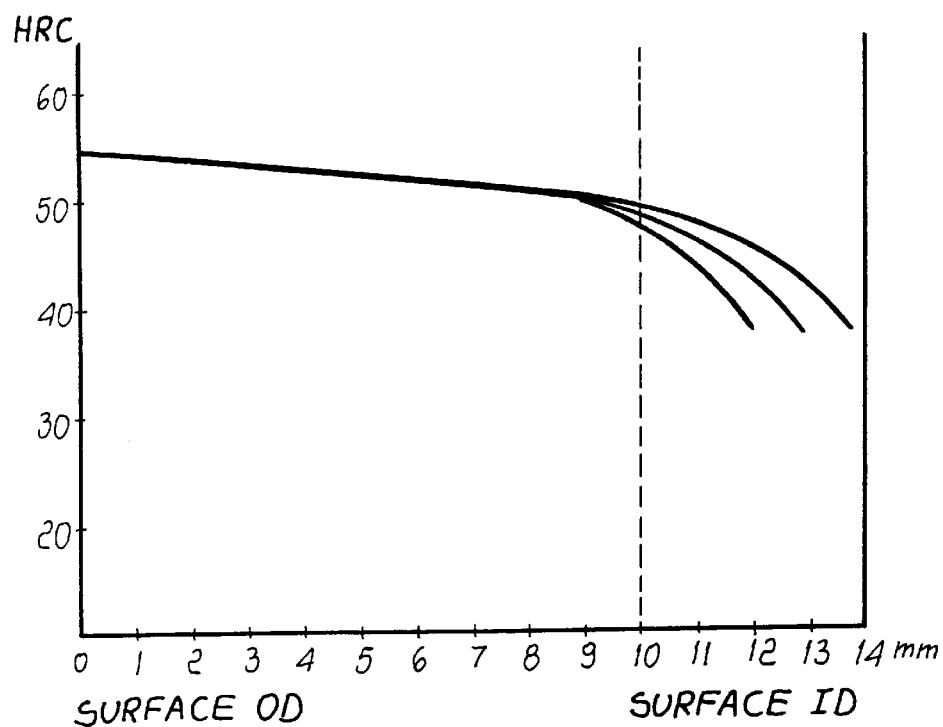
FIG. 5 is a chart showing the hardness profile of a bushing obtained by an initial external hardening and quenching step of a method according to the present invention.
Figure 6:
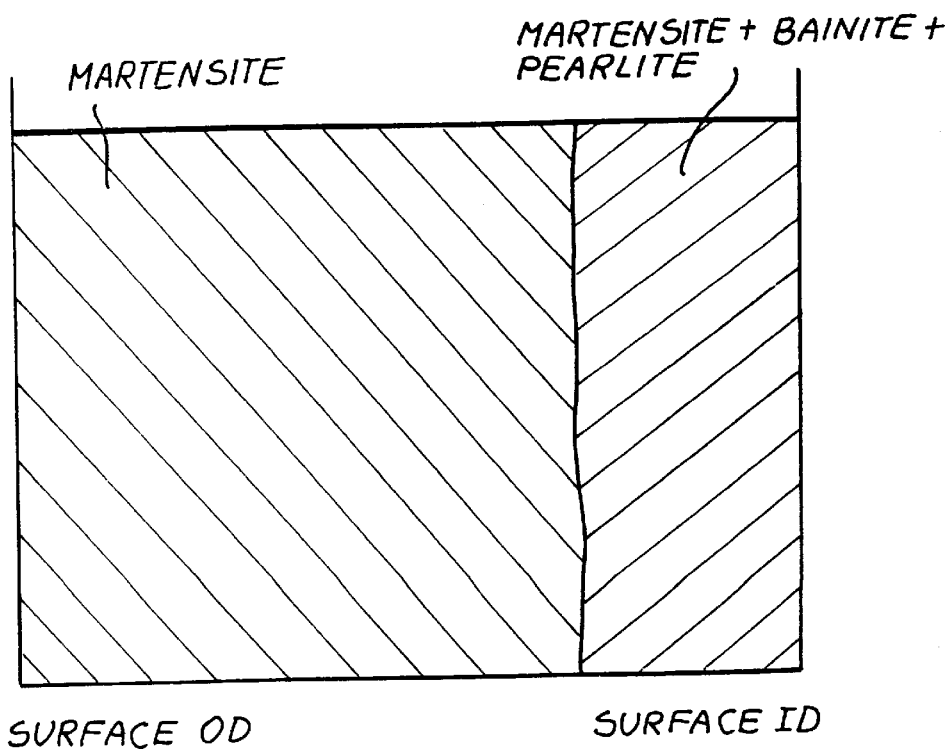
FIG. 6 is a chant showing the metallurgical structure of a bushing with the hardness profile of FIG. 5.

In this case a hardness profile, as shown in FIG. 5, and a metallurgical structure, as shown in FIG. 6, are obtained.

The fact that in the latter figure the internal end leg of the hardness curve has different profiles depends on the hardenability of the material (Jominy) and on the thickness of the bushing.

The process then provides for the execution of hardening by induction heating of the inner surface of the bushing through to a depth of approximately $4/10$–$7/10$ of the thickness thereof starting from the inner surface; heating is performed at a temperature which must reach 800–900° C. on the surface of the part.

Figure 7:
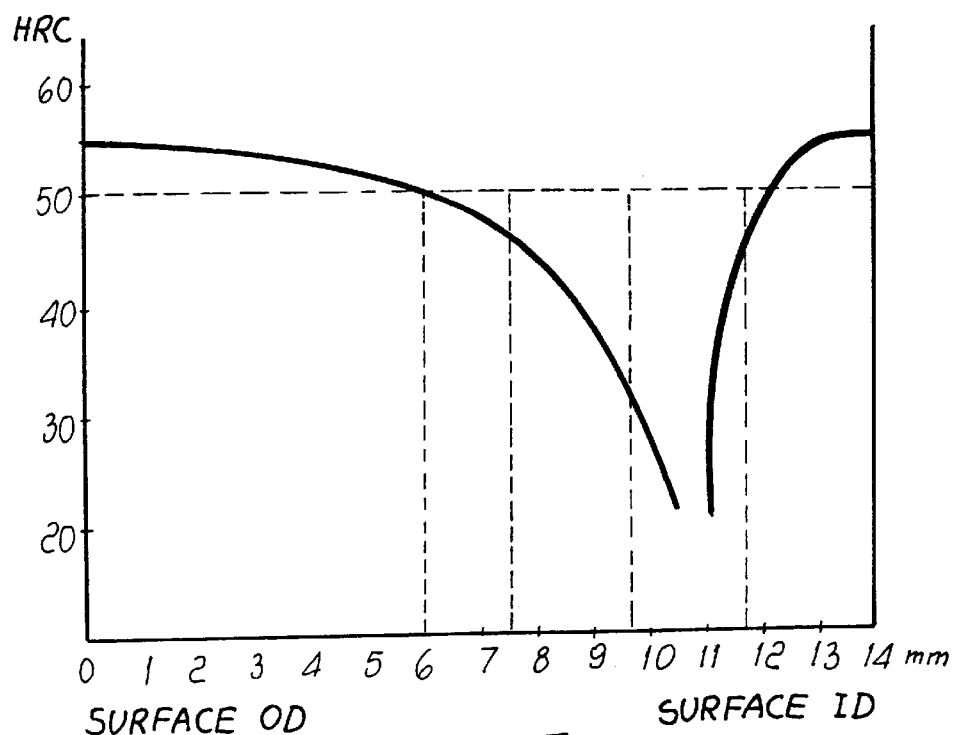
FIG. 7 is a chart showing the hardness profile of the bushing obtained by the initial external hardening and quenching step, and by a successive internal hardening and quenching step of the method according to the present invention.
Figure 8:
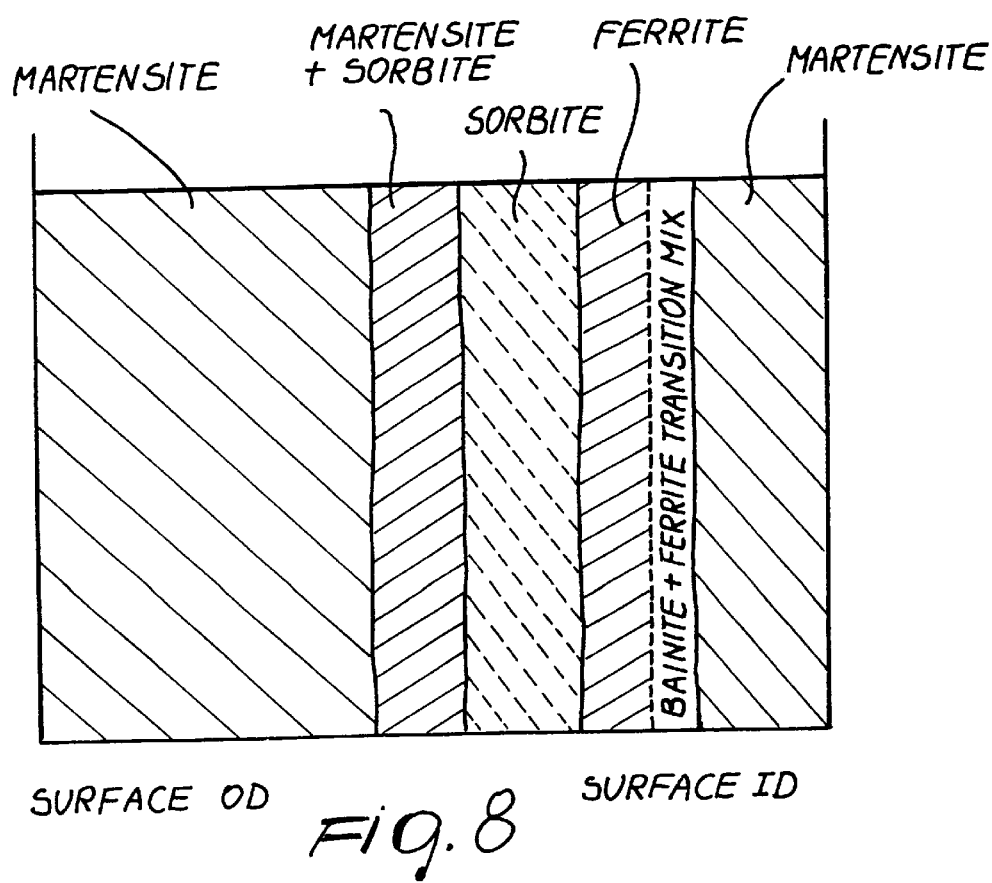
FIG. 8 is a chart showing the metallurgical structure of a bushing with the hardness profile of FIG. 7.

The part is then cooled with quenching liquid; in this case a final hardness profile as plotted in FIG. 7 and a final metallurgical structure as shown in FIG. 8 are obtained.

The method then provides for the execution of a stress relieving step, during which the part is heated, in an electric or gas or other furnace, to a temperature of approximately 150–200° C. for a time which can vary from one to several hours according to the size of the part and to the type of treatment performed; this is done to increase the toughness of the part and to eliminate the tensions inside the steel caused by the treatment itself.

This method allows to obtain for the bushing a metallurgical structure as in FIG. 8, wherein on the surface of the outside (OD) and inside diameters (ID) and on the heads two predominantly martensitic regions are provided; there are also two regions having an intermediate structure, the outer one being a mixed structure of martensite and sorbite and the inner one being much thinner and having intermediate structures such as for example pearlite, ferrite and others.

In the core there is also provided a sorbitic region which allows a toughness equal to that which can be obtained with the conventional method of hardening and tempering plus external and internal quench hardening method.

As regards the hardness curve shown in FIG. 7, it is noted that an optimum profile for wear resistance can be obtained, since there is a region with a hardness of more than 50 HRC which is thicker externally and a thinner region internally, with a sufficiently low core thickness.

FIG. 9 plots the wear that can be observed in a bushing of the type known for machines with the code PC 400 (sold by the Japanese company Komatsu), subjected to the conventional casehardening plus quench hardening process (curve A), to the process with core hardening and tempering plus external and internal induction hardening (curve B), and with a method according to the present invention (curve C).

Wear resistance was checked with sand wear tests to check the durability of the bushing; as shown in FIG. 9, apart from better initial resistance of casehardened bushings, caused by higher surface hardness of the bushings subjected to casehardening and quench hardening treatment, said bushings then wear quickly when the layer of 1.5÷3.5 mm is passed.

Longer life of the bushings obtained with the method according to the present invention was then observed following a wear test on the outer surface thereof.

It has thus been observed that the present invention has achieved the intended aim and objects, a method having been achieved which allows to obtain bushings whose mechanical characteristics are far higher than those obtainable with the conventional method of casehardening plus quench hardening.

With the new method it is possible to differentiate the thickness of the layer having a hardness of more than 50 HRC between the outer surface and the inner surface and it is also possible to achieve far greater thicknesses on the outer surface than allowed by the casehardening plus quench hardening process, thus obtaining a different duration of the useful life of the bushing in case of wear.

The presence of the sorbitic layer, combined with the lower core hardness obtainable with the new treatment, allows greater toughness, since there is a higher resistance to fatigue tests because the casehardening process increases the content of carbon in the steel (approximately 0.8–1%), which thus facilitates the initiation of cracks and microcracks, causing early failure of the bushing.

The presence of the sorbitic layer, combined with reduced core hardness, also allows greater elasticity of the piece: tests conducted again on standard specimens of bushings of the PC 400 type have in fact shown that when performing an upsetting test by compressing, between two parallel planes, rings with a diameter of 30 mm obtained from the bushings to be examined, until the ring fails, it is possible to obtain, for the bushing manufactured with the method according to the present invention, a higher breaking point and a rupture deflection which is at least equal to the best characteristics of bushings obtained with conventional processes.

The new method is also much less expensive, since the casehardening step, whose market price is currently around 1000–1500 lire per kg, is not performed.

The new method, with respect to core hardening and tempering plus internal and external induction hardening of a conventional type, allows cost advantages, for identical mechanical characteristics obtainable to an equal extent with the two methods, since the core hardening and tempering step, whose market price is approximately 600–900 Italian lire/kg, is not performed in the new method.

FIG. 10 illustrates the result of the treatment according to the method of the present invention, performed in a bushing whose characteristics are similar to those of the model used for tracks of Caterpillar D6D machines and made of modified SAE 10B37 steel: the hardness curve for the specimen was assessed in three different cross-sections (at 1 mm from the two heads and at the center).

The results of the upsetting test, performed by compressing rings with a diameter of 30 mm obtained from a specimen no. 1, a specimen no. 2 and a specimen no. 3 between two parallel planes until ring failure, have shown that in specimen no. 1 the compression value in tons which leads to failure is 27.3, whilst in sample no. 2 it is 26.1 and in sample no. 3 it is 29.8.

The resulting bushing has also a martensitic metallurgical structure at its heads: this means higher strength at the oil seal application region.

The present invention is of course susceptible of numerous modifications and variations, all of which are within the scope of the same inventive concept.

Likewise, the materials and the dimensions of the individual components of the invention and the times, temperatures and thicknesses involved by the process may also be the most pertinent according to the specific requirements.

What is claimed is:

1. A method for heat treatment of a bushing used in an endless track mounted to vehicles and having an outer surface and an inner surface and a thickness extending between said outer and inner surfaces, the method comprising the steps of:

a) external quench hardening performed on said bushing by heating, starting from the outer surface of the bushing, through to a depth of about $7/10$ to $10/10$ of the thickness of said bushing and quenching with a cooling liquid;

b) internal quench hardening performed on said bushing by heating, starting from the inner surface of the bushing, through to a depth of about $4/10$ to $7/10$ of the thickness of said bushing and quenching with a cooling liquid;

c) stress relieving of said bushing performed on said bushing in which said bushing is heated, and the steps a and b being performable in different sequences.

2. The method according to claim 1, wherein the external quench hardening step is performed at a temperature being in the range of 800 to 900° C.

3. The method according to claim 2, wherein the internal quench hardening step is performed at a temperature being in the range of 800 to 900° C.

4. The method according to claim 3, wherein in the stress relieving step, said bushing is heated to a temperature of about 150 to 200° C.

5. The method according to claim 4, wherein the steps a), b), and c) are performed on said bushing such that the treated bushing has a metallurgical structure comprising:

two predominantly martensitic regions at external and internal regions of the treated bushing;

two intermediate regions between said external and internal regions, including an outer intermediate region having a mixed structure of martensite and sorbite, and an inner intermediate region which is thinner than said outer intermediate region and said inner intermediate region having metallographic structures; and a high-toughness sorbitic region at a core of the treated bushing.

6. The method according to claim 5, wherein the steps a), b), and c) are performed on said bushing such that said external and internal regions have a hardness exceeding 50 HRC.

7. The method according to claim 5, wherein the steps a), b), and c) are performed on said bushing such that the treated bushing has a martensitic metallurgical structure at head regions of the treated bushing.

8. The method according to claim 6, wherein the steps a), b), and c) are performed on said bushing such that said inner intermediate region has a hardness substantially less than 30 HRC.

9. The method according to claim 5, wherein the treated bushing has a hardness curve including externally a high hardness region with a hardness exceeding 50 HRC which is less thick, and internally a thicker region with a lower core hardness than is generally obtainable with processes of casehardening and quench hardening.

10. The method according to claim 1, wherein the steps a), b), and c) are carried out on said bushing which has not been subjected to an initial core hardening and tempering step.

11. The method according to claim 1, wherein the steps a), b), and c) are carried out on said bushing which has not been subjected to an initial casehardening and quench hardening step.

12. The method according to claim 1, wherein the steps a), b), and c) are carried out on said bushing which has not been subjected to an initial core hardening and tempering step and which has not been subjected to an initial casehardening and quench hardening step.

13. The method according to claim 1, performed on a bushing made of modified SAE 10B37 steel.

* * * * *